United States Patent [19]

Pommier

[11] Patent Number: 4,884,139
[45] Date of Patent: Nov. 28, 1989

[54] METHOD OF DIGITAL SOUND BROADCASTING IN TELEVISION CHANNELS WITH SPECTRUM INTERLACING

[75] Inventor: Daniel Pommier, Mordelles, France

[73] Assignee: Etat Francais, Represente Par Le Secretariat D'etat Aux Post Es Et Telecommunications (Centre National D'etudes Des Telecommunications), France

[21] Appl. No.: 137,369

[22] Filed: Dec. 23, 1987

[30] Foreign Application Priority Data

Dec. 24, 1986 [FR] France .................. 86 18163

[51] Int. Cl.$^4$ .............................................. H04N 7/08
[52] U.S. Cl. ..................... 358/142; 358/143; 358/12
[58] Field of Search ............. 358/142, 141, 12, 11, 358/143; 375/1

[56] References Cited

U.S. PATENT DOCUMENTS

| | | | |
|---|---|---|---|
| 3,842,196 | 10/1974 | Loughlin | 358/12 |
| 4,233,627 | 11/1980 | Sugihara | 358/143 |
| 4,556,973 | 12/1985 | Vemura | 358/142 X |
| 4,621,287 | 11/1986 | Reitmeier et al. | 358/146 X |
| 4,665,427 | 5/1987 | Beckley et al. | 358/12 X |

OTHER PUBLICATIONS

"A New System of Sound Broadcasting to Mobile Receivers" Alard et al.; IEEE Telecommunications, undated; pp. 416–420.

Primary Examiner—James J. Groody
Assistant Examiner—Victor R. Kostak
Attorney, Agent, or Firm—Larson and Taylor

[57] ABSTRACT

Digital broadcasting of a sound program takes place in a channel of a set of channels. In each channel other than that dedicated to digital broadcasting, the television channel has a spectrum of spectral lines separated by low spectral power density intervals. Digital broadcast is achieved by digital modulation (for instance OFDM) of the transmission with frequency multiplexing using a spectrum interlaced with that of the television. The digital signal is recovered by comb filtering on reception.

8 Claims, 2 Drawing Sheets

K=1

K=3

K=1

K=3

METHOD OF DIGITAL SOUND BROADCASTING IN TELEVISION CHANNELS WITH SPECTRUM INTERLACING

BACKGROUND OF THE INVENTION

The invention relates to a method of digital broadcasting in channels assigned to television in a frequency allocation plan and it is particularly suitable for broadcasting of sound programs towards moving vehicles.

Television frequency plans divide the VHF and UHF band into channels each assigned to a television program. But, in a given service zone, all the channels cannot be used simultaneously for TV due to mutual interference. For example, in radio broadcasting at the present time a channel is not used if adjacent to a channel in which broadcasting takes place. Use is also excluded of the same channel in two directly adjacent service zones, for in the regions close to the frontier between the zones, there would be mutual interference. As a consequence, television networks always leave gaps available in the spectrum, in which it is not possible to transmit television signals.

SUMMARY OF THE INVENTION

It is an object of the invention to make it possible to use for digital broadcasting, in a given zone, a channel where television transmission and reception are impossible. In other words, an object of the invention is to use, for digital broadcasting, slots of the frequency spectrum which are unusable for television within the framework of a general frequency distribution plan.

For that, use is made of the structure of the spectrum of a television signal and measures are taken to avoid mutual interference between the TV signal and the digital signal. For that result, it has been necessary to rely on the fact that a television channel, without scrambling of the image, has a spectrum of spectral lines about which the energy is concentrated (as mentioned for instance in U.S. Pat. No. 3,700,793 to Borsuk et al.), due to the existence of several pseudo-periods in the television signal. The spectral lines are predominantly related to the existence of a line scan period. To a lesser degree, the frame and image periods and multiples of the image period contribute to the appearance of these spectral lines, whose distribution in the frequency range will depend more particularly on the color transmission process (PAL, SECAM or NSTC). The energy contained in the zones of the spectrum between the spectral lines is relatively small and, at the edge of the broadcasting zone assigned to a television program, it is unlikely to interfere with signals corresponding solely to frequencies between the spectral lines.

Furthermore, the band width of a television channel is greater than the frequency coherence of the selective Rayleigh channel for digital sound program broadcasting to moving vehicles; this property may be used, more particularly by implementing the process described in French patent application No. 86 09622 (PCT application No. PCT/EP 87/00346 .

It might be thought that, in order to limit the reciprocal degradation of the reception of a television program in a zone and of the digital reception using the same channel in an adjacent zone, it would be sufficient to use known techniques for spreading the digital spectrum to improve the sharing conditions. But the gain brought by such spreading using known techniques remains insufficient.

Consequently, the invention provides a process for digital broadcasting in a television channel whose signal has a spectrum of spectral lines separated by low spectral power density intervals, wherein the digital broadcasting is achieved which includes transmission with digital modulation with frequency multiplexing using a spectrum interlaced with that of the television and reception with comb filtering. An important application consists of digital broadcasting in a service zone adjacent another service zone in which the same channel is occupied by a television program. This application is however not exclusive. For example, the process may be used for broadcasting digital data e.g. sound data in the same zone as a television signal, in two adjacent channels.

Comb filtering makes it possible to attenuate the frequencies in which the television signal has considerable energy; the noise may thus be reduced to a tolerable value for satisfactory reception.

The digital rates which it is possible to broadcast, without affecting the television program, are sufficient for allowing digital sound radio broadcasting, with one or more programs in a single channel. The broadcasting process as such may in particular be as described in French patent application No. 86 09662 and its certificate of addition No. 86 13271. Implementing the present invention simply implies that the frequencies between which multiplexing takes place are chosen so that there is spectral interlacing of the digital signal at the line scan rate (or at the line and image rates) of the television spectrum.

Whatever the type of interlacing chosen, a considerable gain will be obtained with respect to the protection afforded to the television signal; protection of the digital signal will be obtained due to the association of channel coding and the effect of the comb filter on demodulation.

In order to obtain the interlacing condition at the line level, it is sufficient, in the case of the digital signal modulation called OFDM (orthogonal frequency division multiplex) to use symbols of a duration equal to 2k times the television line period T and, for forming the alphabet of modulation signals, to use one frequency only among 2k frequencies. To interlace the digital broadcasting spectrum with the television spectrum, the symbol frequencies will be given values equal to odd multiples of the half line frequency $\frac{1}{2}T$. This latter condition is equivalent to repeating $2k-1$ times symbols having a duration T (i.e. to transmit them 2k times), with inversion of the phase at each repetition, phase continuity being provided by the relationship between frequencies of the OFDM and odd multiples of $\frac{1}{2}T$.

With, for example, a line period T=64 μs, the symbol duration will be of 128, 256 or 384 μs depending on whether k is equal to 1, 2 or 3. Generally, interlacing at the line level will simply lead to extending the duration of the symbols.

To fulfil the interlacing condition at the image level and again in the case of OFDM modulation, the digital signal will be structured in modulation frames of a duration equal to that of a television image. There will no longer be individual repetition of the symbols but identical repetition of the whole frame $(2l-1)$ times (l being an integer), with symbol frequencies chosen equal to odd multiples of the image halffrequency, which is 12.5

Hz in Europe. This frame repetition provides the desired precision offset.

Additional interlacing may be further provided at the level of multiples of the image period, to the extent that the spectrum has spectral lines at these frequencies. But, in general, the corresponding complication will not be justified all the more since it becomes difficult to maintain the equality with the required precision between the frequency of the modulation symbols and the corresponding frequency in the television spectrum. In practice, it is necessary to provide an accuracy within 1 Hz to make interlacing at the image level efficient. This precision must be further increased when passing over a multiple of the image period.

The invention will now be described in detail with reference to the accompanying drawings which show particular embodiments. Reference will first of all be made to the process used, the hardware means being typically similar to that described in French Certificate of Addition No. 86 13271, to which reference may be made.

SHORT DESCRIPTION OF THE DRAWINGS

DETAILED DESCRIPTION OF PREFERRED EMBODIMENTS

Before giving examples of implementation of the process of the invention, it is important to show the nature of the power spectrum of a digital signal with OFDM modulation whose symbols have a duration equal to 2k times the duration T of a television line and the self correlation function of such a signal.

The power spectrum $\gamma_L(v)$ of the digital signal interlaceable at the TV line level may be written, as a function of frequency (v)

$$\gamma_L(v) = A^2 \left[ \frac{\sin \pi v 2kT}{2kvT} \right]^2 * \sum_{n=-N/2}^{N/2} \delta(v - n/T)$$

If now we designate by F(v) the rectangular window function containing the set of symbols of the digital modulation, we may write:

$$\gamma_L(v) = A^2 \left[ \frac{\sin \pi v 2kT}{2kvT} \right]^2 * \left[ \sum_{-\infty}^{+\infty} \delta(v - n/T) \cdot F(v) \right]$$

from which the self correlation function $\Gamma$ may be derived:

$$\Gamma_L(\tau) = g_{4kT}(\tau) \cdot \sum_{n=-\infty}^{+\infty} [\sin \pi F(\tau - nT)/\pi F(\tau - nT)]$$

where $g_{4kt}(\tau)$ is the triangular gate of support width 4kT.

It should be noted that k=0 corresponds to the conventional OFDM modulation, which does not allow any interlacing with the television spectrum.

Figure 1A:
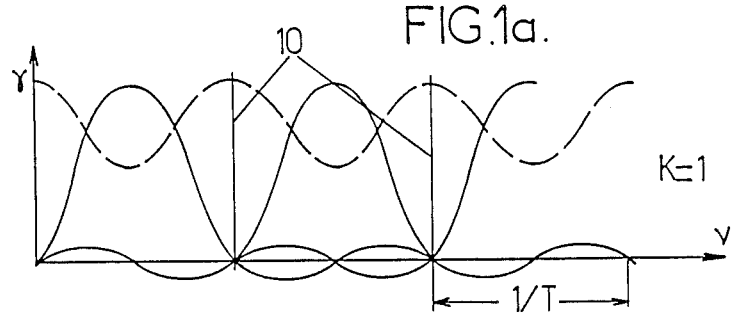
FIGS. 1a and 1b show schematically the interlacing of the television spectrum (whose energy distribution is shown in the form of a broken line) and of the digital broadcasting spectrum (shown with a continuous line), respectively for k=1 and 3.
Figure 2A:
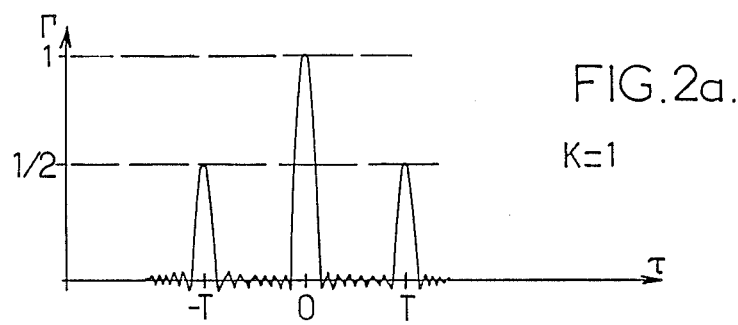
FIGS. 2a and 2b show schematically the self correlation function $\Gamma$ of the digital signal for k=1 and 3.

FIGS. 1a and 2a show respectively, in full lines, the digital spectrum $\gamma_L(v)$ and the self correlation function $\Gamma_L(\tau)$ for k=1.

Referring to FIG. 1a, the spectral lines 10 of the energy spectrum of the television signal are spaced apart by 1/T and the energy maxima of the digital signal are midway between the spectral lines 10. The self correlation function of the digital signal illustrated in FIG. 2a shows a central peak for $\tau=0$ and two side peaks for $\tau:+T$ and $-T$, each having a height half that of the central peak.

For T=64 μs (the line period duration in Europe), this approach leads to symbols 128 μs long and to a substantially balanced power distribution betwen the central peak and the side peaks.

Figure 1B:
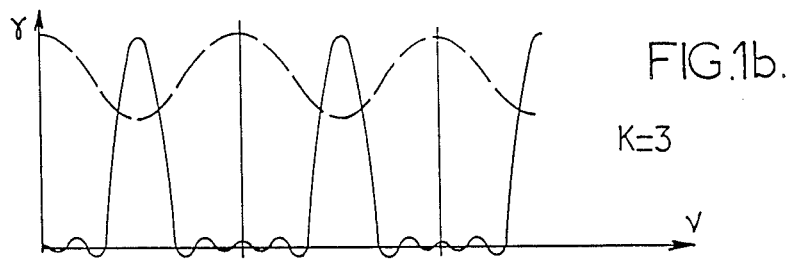
Figure 2B:
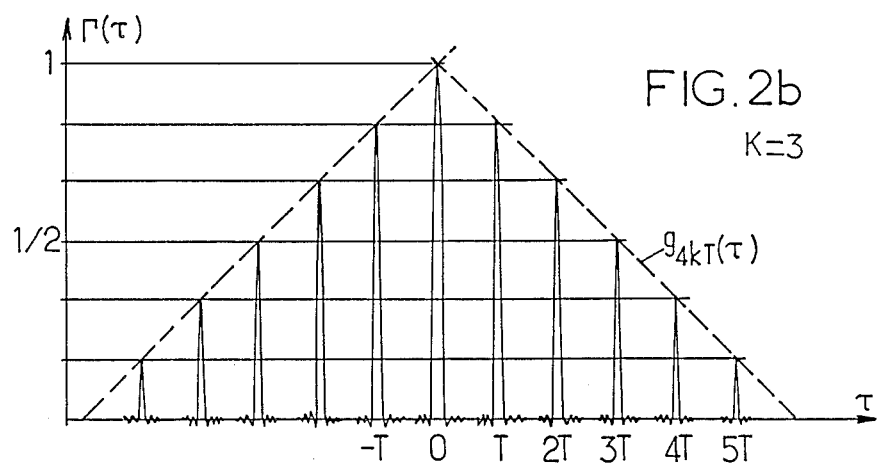

The distribution may be made more favorable by increasing the valve of k. For k=3 for example, (corresponding to symbols of 384 μs), the functions shown in FIGS. 1b and 2b are obtained, which shown an increase in the power of the side peaks to the detriment of the central peak.

Theoretical considerations, similar to those given above, make it possible to select the structure to be given to the digital signal so as to provide an offset for image precision (which will generally be combined with interlacing of the spectrum at line frequency). As mentioned above, the image precision offset involves structuring the digital signal into modulation frames of a duration equal to that of the television image, the frame being repeated 21−1 times with symbol frequencies equal to odd multiples of the image half frequency.

The power spectrum $\gamma_I(v)$ centered at the origin may be written, in the case of interlacing and offset used together:

$$\gamma_I(v) = \gamma_L(v) \cdot \left[ \left( \frac{\sin \pi v 2lT_0}{2lvT_0} \right)^2 * \sum_{i=-\infty}^{+\infty} \delta(v - i/T_0) \right]$$

where $T_0$ is the duration of the television image.

The self correlation function may then be written as:

$$\Gamma_I(\tau) = [\Gamma_L(\tau)] * \left[ g_{4lT}(\tau) \cdot \sum_{-\infty}^{+\infty} \delta(\tau - iT_0) \right]$$

where $g_{4lT}$ is the triangular gate of support width $4t_0$.

It can be seen that $\Gamma_I(t)$ is a product of two factors and that the visibility of the interfering digital signal in the television signal is further reduced, since the second factor of the convolution product extends the support of the self correlation function beyond a single television image (as in the case of FIGS. 2a and 2b), over 41 images. On the other hand, the use of interlacing at the image level involves repeating the same 40 ms message 21−1 times.

Embodiments will now be given, limited ot the case where interlacing alone is used at the line level; that approach is more simple to use and does not require a great precision of the transmitted signals; these examples correspond to a digital broadcasting system whose basic parameters are as follows:

| | |
|---|---|
| Number of OFDM carriers | 256 |
| Number of useful carriers (the limitation being for easier construction of reception filters) | 224 |
| Separation between carriers | 15.625 kHz |
| Total frequency band occupied | 3.5 MHz |
| Modulation | MDP 2 |
| Convolutive efficiency code, having a yield of | ½ |
| Constraint length of the code | 6 |
| Ratio between the total energy per bit and the noise for an error rate of $10^{-3}$ | Eb/no = 7dB |

Table 1 below gives, for different values of k, the values of those of the parameters of the digital signal which depend on k, for a line period $T=64$ μs and in the case where the time margin reserved for avoiding intersymbol interferences (as defined in French Certificate of Addition No. 86 13271) is also of 64 μs. This choice is determined by two requirements: the symbols must have a duration equal to 64 μs and the observation windows in the receiver must be assigned to durations of 64 μs so as to maintain the orthogonality between symbols.

TABLE 1

| k | 1 | 2 | 3 | 4 |
|---|---|---|---|---|
| Duration of symbol 2kT (μs) | 128 | 256 | 384 | 512 |
| Useful duration of a symbol 2kT-T (μs) | 64 | 192 | 320 | 488 |
| Loss: log 2k/(2k-1) (dB) | 3 | 1.25 | 0.8 | 0.6 |
| E'b/No* for an error rate of $10^{-3}$ (dB) | 10 | 8.25 | 7.8 | 7.6 |
| Useful rate (kbits/s) | 875 | 437.5 | 219.66 | 218.75 |

*E'b designates the total energy per bit, including (Contrary to Eb) the margin of 64)s against intersymbol interferences.

The conditions will now be determined in which the process of the invention may be applied to a situation in which:

a television data channel is effectively used in a first service zone, the same television channel is to be used for a service for broadcasting data towards moving vehicles in a second zone, adjacent the first one.

The situation will be considered first of all which exists at the limit between the two zones and the physical characteristics to provide so that, at this limit, sharing between television signal and data broadcasting is possible.

The conditions to be fulfilled so that the television signal is acceptable are the following:

the luminance L/noise B ratio in a band of 5.5 MHz where the television service must be protected should have a minimum value $(L/B)_{min}=27$ dB, the ratio between the peak power of the television signal $C_{TV}$ and the noise N in the same 5.5 MHz band should have a minimum value of 30 dB.

The protection ratio to be provided between the television carrier and the digital carrier, so as to obtain the above ratio (L/B) of 27 dB, for a weighted degradation of (L/B) less than 1 dB, should be 23 dB at least. This figure takes into account the effect of spectrum interlacing and the addition between gaussian thermal noise and the digital signal whose amplitude distribution is gaussian.

Protection by the television reception antenna is generally of the order of 0 dB.

The 23 dB protection ratio will be obtained, as will be seen further on, by the combination of two measures, the offset of the digital carrier to provide line interlacing (from which a gain of 13 dB may be expected), and the choice of the most favorable position of the 3.5 MHz band of the interfering signal, formed more particularly by the digital signal, in the television channel. But the value of 23 dB only represents an approximation and precise measures may lead to modifying it, all the more so since it is likely to depend to a certain extent on k.

For the digital signal, the parameters to be taken into consideration are essentially, apart from k, the margin m, in dB, which can be accepted with respect to broadcasting in free space (corresponding to the mask effects, betwen space and the means value of the field received by a moving vehicle in a masked zone); m may be defined as 10 Log Pe/Pm where Pe is the power in free space and Pm the mean power received, reduced by the mask effects; this margin should be of from 15 to 20 dB in an urban area, 5 dB in a rural area, the useful digital rate Du (megabits per second).

The relation which gives the maximum useful digital rate not disturbing television reception at the limit of the zone as a function of m and k may be written:

$$pSu=[(2k-1)/2k]\,5.5.10^{-m/10} \qquad \text{(Du in Mhz)}$$

The following Table II gives the digital values of the maximum useful flow rate Du in megabits/second for $k=1, 2, 3$ and 4 and for different values of m:

TABLE II

| k | m(dB) | | | | |
|---|---|---|---|---|---|
| | 3 | 5 | 10 | 12 | 14 |
| 1 | 1,37 | 0,87 | 0,275 | 0,173 | 0,109 |
| 2 | 2 | 1,3 | 0,41 | 0,26 | 0,164 |
| 3 | 2,3 | 1,45 | 0,46 | 0,29 | 0,18 |
| 4 | 2,4 | 1,52 | 0,48 | 0,30 | 0,19 |

A comparison between Tables I and II shows that, with a sufficient value of k, it is always possible to provide compatibility between:

rates not disturbing television reception and digital rates transmitted in OFDM modulation with interlacing at the line level.

The optimum choice for a given value of m generally corresponds to the highest value of k met with and compatible in rate with Table I: it can be seen above that the hatched values are not acceptable.

The above analysis shows that it is possible to accept digital broadcasting, in a service zone adjacent a television broadcasting zone protected up to unweighted ratios (L/B) of 28 dB, of a digital signal whose rate depends on the margin m with respect to the free space at the limit of the two coverage zones.

If the digital signal corresponds to sound broadcasting, it is hardly possible to exceed $k=3$ and $m=12$ since the rate available beyond such values is less than the 250 kbits/s required for a high quality stereophonic program.

Because of the progressive attenuation of the digital signal inside the service zone where the television broadcasting takes place, the situation is more favorable for the television signal.

To sum up, the same channel can be used:

for broadcasting a television signal in a first region,
for digital broadcasting in an adjacent region,
and this, for the digital signal, with margins m with respect to the free space beyond 5 at the limit between the two service zones,
and with useful digital rates of from 870 kbits to 190 kbits for margins of from 5 to 14 dB.

Figure 3:
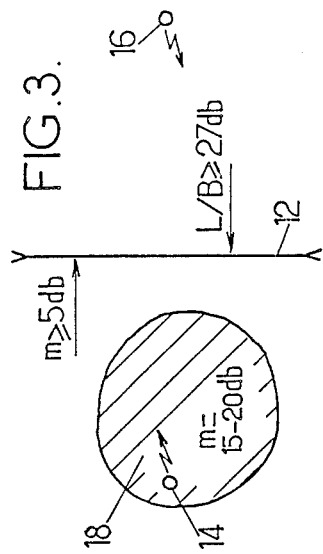
FIG. 3 is a diagram showing one possible geographic arrangement of digital broadcasting and television program broadcasting zones.

FIG. 3 shows an implantation which may be considered as typical. A transmitter 14 for digital broadcasting to mobile vehicles and a television transmitter 16 are located in two adjacent zones, on each side of a borderline 12. As mentioned above, the ratio L/B for the television signal must be at least 27 dB at the borderline. The digital transmitter is generally set up so as to serve an urban area 18 and has a low power as compared with that of a television transmitter which would have to cover the same zone. The borderline 12 is generally in a rural or suburban zone. Calculation shows that as a general rule a margin can be obtained with respect to broadcasting in free space which is from 15 to 20 dB for digital broadcasting to moving vehicles in the urban area 18 and that a margin of 5 to 10 dB can be obtained for digital broadcasting close to the frontier 12, that is to say in a region where the television begins to be received. Practice has shown that such a margin of 5 to 10 dB is sufficient for reception in vehicles in a rural or suburban zone.

The rates shown in FIG. 2 are sufficient to allow broadcasting of two high quality sound programs using one channel which, in an adjacent zone, is effectively used for broadcasting television programs.

By keeping the same method of modulation and interlacing, the residual mutual interference may be totally eliminated in the case where the channels used in adjacent zones are not identical but simply adjacent. In this case, the maximum capacity of the channel may be reached, the rate being then only limited by the modulation and encoding devices: three high quality radio programs may thus be transmitted without difficulty.

In comparison with the use of conventional OFDM modulation, with dense spectrum (corresponding to k=0) which allows broadcasting with a higher digital rate, it can be seen that a gain of about 20 dB is obtained with respect to the protection of the same television channel used in a neighbouring region. This increase in protection can be attributed for about 13 dB to the effect of offsetting the high energy density zones in the spectrum and for 7 dB to the reduction of the digital rate.

Jamming of the digital signal by the television signal is also attenuated, and in some cases makes it possible to accept a certain overlapping of the service zones.

A system for broadcasting digital data for implementing the process of the invention will not be described completely since its transmission device may have the construction described in French patent application No. 86 09622 and the receiver may be as described in the same patent application or in Certificate of Addition No. 86 13271.

Figure 4:
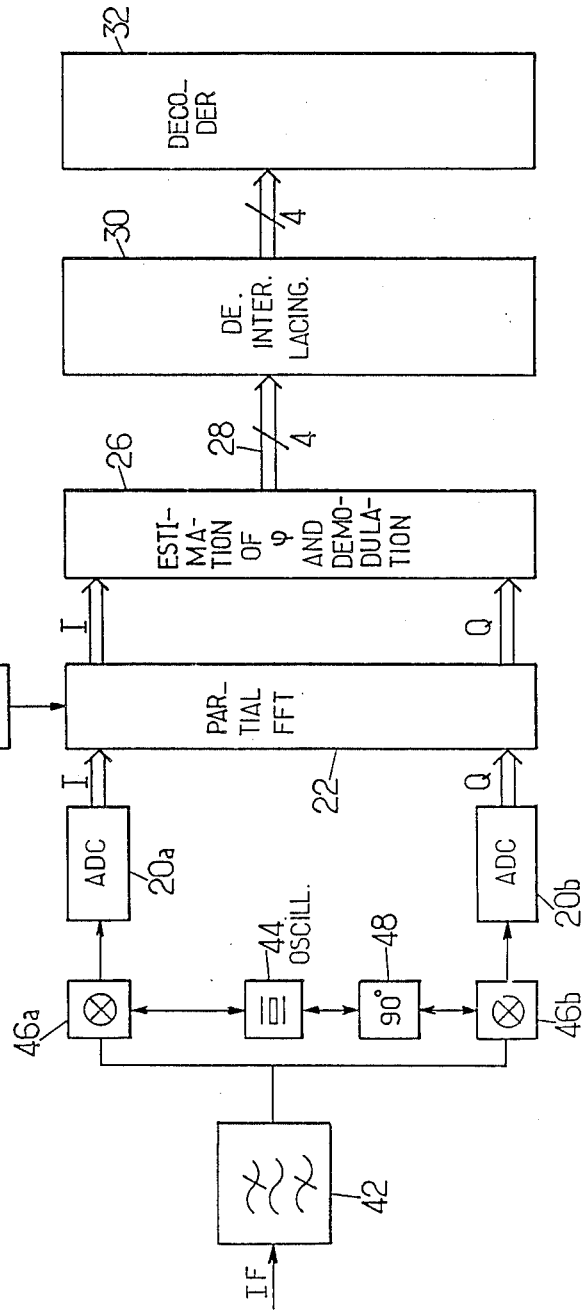
FIG. 4 shows a possible decoder construction for reception of the digital signal.

Referring to FIG. 4, a receiver comprises a decoder following conventional input stages delivering an intermediate frequency signal. The decoder includes a channel filter 42 formed by a band pass filter whose width corresponds to the whole of the spectrum occupied by the digital broadcasting carriers.

The signal supplied by filter 42 is projected on two carriers in quadrature at the central frequency of the channel, provided by an oscillator 44 which drives one of the inputs of a multiplier 46a directly and one of the inputs of a multiplier 46b through a phase shifter 48. The two multipliers receive the output signal of filter 42.

The output of each multiplier drives an A/D converter 20a or 20b delivering input samples to a fast Fourier transform computing circuit 22. A program selection circuit 24 is associated with circuit 22 and determines the addresses, in the memory storing the intermediate results contained in circuit 22, where the samples are located on which the computation is to be continued and which correspond to one of the sound channels.

Finally, the samples supplied by circuit 22 are applied to a phase estimation and demodulation circuit 26 and quantified output data are applied to a deinterlacing circuit 30 then to a decoder 32.

I claim:

1. Process for broadcasting of digital signals in a television channel subjected to interference with a television program broadcast in an adjacent channel in the form of a signal having a spectrum of a plurality of spectral lines separated by low spectral power density intervals, comprising distributing said digital signals between a plurality of frequencies interlaced with the spectral lines of the signal of the television program for transmission, whereby frequency multiplexing is achieved and extracting said digital signals by comb filtering on reception.

2. Process according to claim 1, comprising encoding said digital signals according to a code involving convolution between bits represent digital signals and transmitted by all the carriers of the respective channel, the coherence band of the selective Rayleigh channel being lower than the total spectral band occupied by the digital signals by at least another magnitude.

3. Process for broadcasting of from 2 to 4 high quality sound programs in a same television channel subjected to interference with a television program which is broadcast in an adjacent television channel and which has a spectrum consisting of a plurality of spectral lines separated by low spectral power density intervals, comprising the steps of: distributing said digital signals between a plurality of frequencies interlaced with the spectral lines of the signal of the television program for transmission, whereby frequency multiplexed is achieved; extracting said digital signals by comb filtering on reception; and selecting one of said high quality sound programs by comb-filtering with a partial Fourier transform upon reception.

4. Process for broadcasting of digital signals in a television channel subjected to interference with a television program which is broadcast in raster scan in an adjacent channel and is in the form of a signal having a spectrum of a plurality of spectral lines separated by low spectral power density intervals, comprising: processing said digital signal to form symbols each having a duration equal to 2kT, T being the line scan period of said television program and k being a predetermined integer at least equal to 1; distributing said symbols over a plurality of OFDM multiplexed carriers using one frequency only out of 2k available frequencies; and extracting said digital signals by comb filtering on reception.

5. Process according to claim 4, wherein each symbol has frequencies whose values are equal to odd multiples of the half line frequency.

6. Process according to claim 5, wherein each symbol of duration kT is repeated (2k−1) times, with k being of from 1 to 4.

7. Process according to claim 4, wherein the digital signal is structured into modulation frames each having a duration equal to that of an offset television program and wherein each said frame is repeated (2l−1) times, with l being an integer greater than 1, with symbol frequencies equal to odd multiples of the half frequency of the television image.

8. Process according to claim 4, wherein said digital broadcasting is carried out within a service zone adjacent to an other service zone in which the same channel is dedicated to said television program.

* * * * *